US009979721B2

(12) United States Patent
Liu et al.

(10) Patent No.: US 9,979,721 B2
(45) Date of Patent: May 22, 2018

(54) METHOD, SERVER, CLIENT AND SYSTEM FOR VERIFYING VERIFICATION CODES

(71) Applicant: TENCENT TECHNOLOGY (SHENZHEN) COMPANY LIMITED, Shenzhen (CN)

(72) Inventors: Jinxing Liu, Shenzhen (CN); Jie Tu, Shenzhen (CN); Guoping Yan, Shenzhen (CN); Jie Zhang, Shenzhen (CN); Xiaoqiang Fu, Shenzhen (CN); Yuanhui Xie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 217 days.

(21) Appl. No.: 14/858,569

(22) Filed: Sep. 18, 2015

(65) Prior Publication Data

US 2016/0014120 A1 Jan. 14, 2016

Related U.S. Application Data

(63) Continuation of application No. PCT/CN2014/074790, filed on Apr. 4, 2014.

(30) Foreign Application Priority Data

Apr. 11, 2013 (CN) .......................... 2013 1 0125252

(51) Int. Cl.
*H04L 29/06* (2006.01)
*G06F 21/31* (2013.01)
(Continued)

(52) U.S. Cl.
CPC ........ *H04L 63/0861* (2013.01); *H04L 9/3231* (2013.01); *H04L 63/08* (2013.01); *H04L 63/083* (2013.01); *H04L 63/105* (2013.01)

(58) Field of Classification Search
CPC ....... H04L 63/08; H04L 63/10; H04L 63/105; H04L 63/083; H04L 9/3231; H04L 2463/082; G06F 21/32; G06F 21/31
See application file for complete search history.

(56) References Cited

U.S. PATENT DOCUMENTS 8,453,207 B1 * 5/2013 White ..................... G06F 21/32
380/229
8,881,251 B1 * 11/2014 Hilger ................... H04L 63/083
713/183

(Continued)

FOREIGN PATENT DOCUMENTS

CN    101630372 A    1/2010
CN    101662365 A    3/2010

(Continued)

OTHER PUBLICATIONS

International Search Report dated Jul. 14, 2014.
Chinese Office Action dated Aug. 28, 2017.

*Primary Examiner* — Tae K Kim
(74) *Attorney, Agent, or Firm* — Brinks Gilson & Lione

(57) ABSTRACT

Disclosed are a method, server, client and system for verifying a verification code. The method includes: sending a verification picture to a client according to a verification request from the client; acquiring from the client voice information that is input by a user according to the verification picture; and processing the voice information and performing verification according to acquired voiceprint information and/or text information. The server includes a sending module, an acquiring module and a verifying module. The client includes a receiving module, an acquiring module and a sending module. The system includes a server and a client. It may be effectively distinguished as whether the verification code is submitted by the user or by others, such that the problem of manual coding is effectively solved, (Continued)

and the operating cost of the server side is reduced and the overhead is saved.

14 Claims, 4 Drawing Sheets

(51) Int. Cl.
*G06F 21/32* (2013.01)
*H04L 9/32* (2006.01)

(56) References Cited

U.S. PATENT DOCUMENTS

| | | | | |
|---|---|---|---|---|
| 2002/0095586 | A1* | 7/2002 | Doyle | G06F 21/32 |
| | | | | 713/186 |
| 2003/0200217 | A1* | 10/2003 | Ackerman | G06F 21/32 |
| 2007/0234065 | A1* | 10/2007 | Dufour | G06F 21/32 |
| | | | | 713/186 |
| 2007/0234066 | A1* | 10/2007 | Dufour | G06F 17/30569 |
| | | | | 713/186 |
| 2008/0113791 | A1* | 5/2008 | Williams | G06F 21/36 |
| | | | | 463/29 |
| 2009/0083847 | A1* | 3/2009 | Fadell | G06F 21/316 |
| | | | | 726/16 |
| 2011/0314559 | A1* | 12/2011 | Jakobsson | G06F 21/36 |
| | | | | 726/28 |
| 2011/0320353 | A1* | 12/2011 | Mehew | G06Q 20/206 |
| | | | | 705/44 |
| 2012/0254940 | A1* | 10/2012 | Raper | G06Q 20/4014 |
| | | | | 726/3 |
| 2013/0060569 | A1 | 3/2013 | Fu et al. | |
| 2013/0282589 | A1* | 10/2013 | Shoup | G06F 21/34 |
| | | | | 705/67 |
| 2014/0039892 | A1* | 2/2014 | Mills | G06F 21/32 |
| | | | | 704/246 |
| 2014/0189808 | A1* | 7/2014 | Mahaffey | H04L 63/083 |
| | | | | 726/4 |

FOREIGN PATENT DOCUMENTS

| | | |
|---|---|---|
| CN | 101685635 A | 3/2010 |
| CN | 102208978 A | 10/2011 |
| CN | 102255913 A | 11/2011 |
| CN | 102377736 A | 3/2012 |
| CN | 102413100 A | 4/2012 |
| CN | 102438024 A | 5/2012 |
| CN | 102543084 A | 7/2012 |
| CN | 102833753 * | 12/2012 |
| CN | 102833753 A | 12/2012 |
| CN | 102833753 A | 12/2012 |
| WO | 2010055159 A2 | 5/2010 |

* cited by examiner

US 9,979,721 B2

1

METHOD, SERVER, CLIENT AND SYSTEM FOR VERIFYING VERIFICATION CODES

This application is a continuation of international application No. PCT/CN2014/074790, filed on Apr. 4, 2014, which claims priority to Chinese Patent Application No. 201310125252.2, filed before Chinese Patent Office on Apr. 11, 2013, and entitled "METHOD, SERVER, CLIENT AND SYSTEM FOR VERIFYING VERIFICATION CODES", which is incorporated by reference herein in its entirety.

TECHNICAL FIELD

The present disclosure relates to the field of communications, particularly to a method, server, client and system for verifying a verification code.

BACKGROUND

As a means of distinguishing whether a user is an authorized user or an unauthorized user, a verification code may effectively prevent wrong hands from using automated programs to violently break passwords, brush tickets, mass posting of comments in the forums and perform other malicious actions.

At present, a common verification code is WYSIWYG type verification code, the fundamental principle of which is as follows: a server generates a string of random numbers or symbols into a picture, adds some interference elements in the picture and then issues to a client, where the interference in the picture may be a number of straight lines drawn at random or noise or the like; and after the client receives the picture, a user identifies the verification code in the picture with the naked eyes, and then inputs the verification code into a form to be submitted to the server for verification. The user may use a certain function in the client only after the verification is successful.

Another common verification code is mobile phone verification code. In this solution, an available mobile phone number is required from a user, a server generates a string of verification code at random and issues the verification code to the mobile phone by means of text messages or phone calls; and then, the user submits the received verification code to the server in a form for verification. The user may use a certain function in the mobile phone only after the verification is successful.

The major disadvantage of the above first verification code is that the problem of manual coding may not be solved. For the same verification picture, the input results of all people are the same. Some unauthorized users employ specialized coding personnel to input the verification code according to the content of the verification picture after stealing accounts, passwords and other personal information, so as to perform unauthorized operations. Therefore, for the way of manual coding by unauthorized users, effective verification may not be implemented using the above verification code.

While in the solution of mobile phone verification code, an available mobile phone number is required from a user. However, many users may not have mobile phones or may not carry mobile phones around. As a result, such verification code is limited by the application scenarios and may not be used at scale. Meanwhile, as the verification code is issued by operators, the operating cost at the server side is extremely high.

SUMMARY

To solve the problem of manual coding, expand the range of application, and reduce the cost, the embodiments of the present disclosure provide a method, server, client and system for verifying a verification code. The following technical solutions are employed.

In one aspect, an embodiment of the present disclosure provides a method for verifying a verification code, including:

sending a verification picture to a client according to a verification request from the client;

acquiring from the client a voice information that is input by a user according to the verification picture; and processing the voice information and performing verification according to acquired voiceprint information and/or text information.

In another aspect, an embodiment of the present disclosure further provides a method for verifying a verification code, including:

receiving a verification picture sent by a server, the verification picture including a verification code to be verified;

acquiring a voice information that is input by a user according to the verification picture; and sending the voice information to the server such that the server processes the voice information and performs verification according to acquired voiceprint information and/or text information.

In yet another aspect, an embodiment of the present disclosure further provides a server for verifying a verification code, including:

a sending module, configured to send a verification picture to a client according to a verification request from the client;

an acquiring module, configured to acquire from the client a voice information that is input by a user according to the verification picture; and a verifying module, configured to process the voice information and perform verification according to acquired voiceprint information and/or text information.

In still another aspect, an embodiment of the present disclosure further provides a client for verifying a verification code, including:

a receiving module, configured to receive a verification picture sent by a server, the verification picture including a verification code to be verified;

an acquiring module, configured to acquire a voice information that is input by a user according to the verification picture; and a sending module, configured to send the voice information to the server, such that the server processes the voice information and performs verification according to acquired voiceprint information and/or text information.

In yet still another aspect, an embodiment of the present disclosure further provides a system for verifying a verification code, including the server and the client.

The technical solutions provided in the embodiments of the present disclosure have the following advantages: by sending a verification picture to a client, acquiring from the client voice information that is input by a user according to the verification picture, and processing the voice information and performing verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved.

BRIEF DESCRIPTION OF THE DRAWINGS

To describe the technical solutions in the embodiments of the present disclosure more clearly, the accompanying drawings to be used for describing the embodiments will be briefly introduced as below. Apparently, the accompanying drawings in the following description show merely some embodiments of the present disclosure, and persons of ordinary skill in the art may still derive other drawings from these accompanying drawings without creative efforts.

DETAILED DESCRIPTION

To make the objects, technical solutions and advantages of the present disclosure clearer, the implementation manners of the present disclosure will be further described as below in details with reference to the accompanying drawings.

Figure 1:
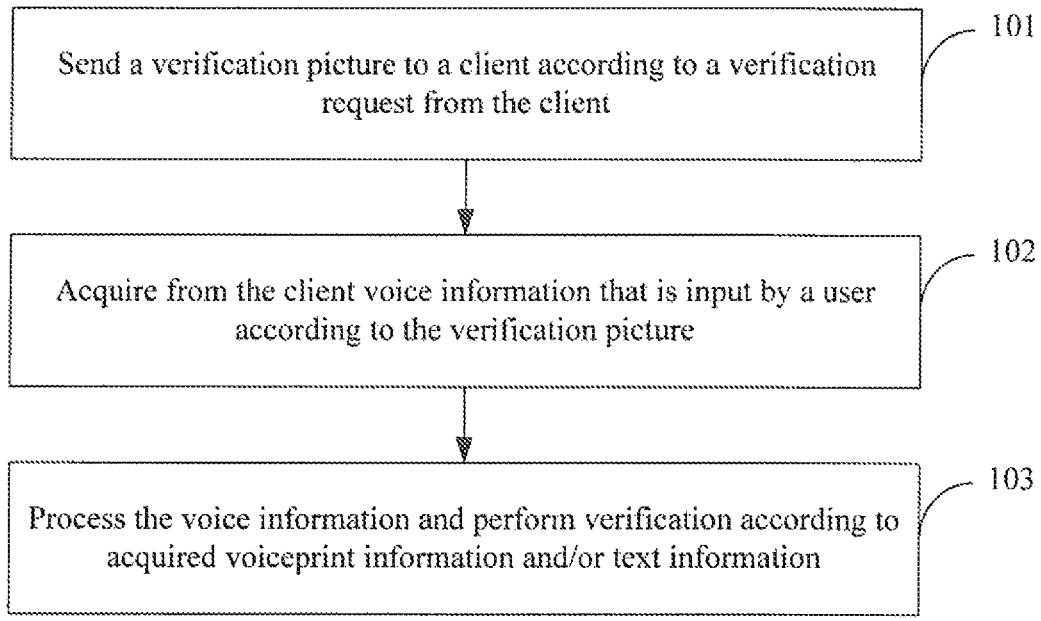
FIG. 1 is a flowchart of a method for verifying a verification code according to an embodiment of the present disclosure.

Referring to FIG. 1, an embodiment of the present disclosure provides a method for verifying a verification code, including:

101: sending a verification picture to a client according to a verification request from the client, the verification picture including a verification code to be verified;

102: acquiring from the client a voice information that is input by a user according to the verification picture; and

103: processing the voice information and performing verification according to acquired voiceprint information and/or text information.

In this embodiment, the verification picture further contains some interference elements other than the verification code to be verified. The verification code may be any combination of numbers, letters, characters and the like, and the interference elements may be random straight lines, curves, noise and the like, which is not specifically limited in the embodiment of the present disclosure.

The method provided in this embodiment is applicable to a scenario where a user performs some operations on the client. In such a scenario, the server is required to verify the identity of the user. Specifically, the server verifies the identity of the user via a verification code; if the verification via the verification code is successful, the identity of the user is determined to be authorized, and the user is allowed to perform corresponding operations on the client; and if the verification via the verification code is failed, the user is determined to be unauthorized, and the user is prohibited to perform corresponding operations on the client.

The client may be a computer, a laptop computer, a mobile terminal, or a tablet computer or the like, which is not specifically limited in the embodiment of the present disclosure.

For example, if a user downloads a document from a client, a server verifies the user via a verification code. If the verification is successful, the user is allowed to download the document; and, if the verification is failed, the user is prohibited to download the document.

In this embodiment, inputting voice information by the user according to the verification picture means that the user reads the content in the verification code and then inputs the same into the client via a voice input device after viewing the verification picture. The voice input device may be a microphone, or the like.

With reference to the above method, in a first implementation manner, the processing the voice information and performing verification according to acquired voiceprint information and/or text information may include:

processing the voice information to acquire the voiceprint information, comparing the acquired voiceprint information with pre-stored voiceprint information of the user, and determining that the verification is successful if the acquired voiceprint information is consistent with the pre-stored voiceprint information of the user.

With reference to the first implementation manner, in a second implementation manner, the processing the voice information to acquire the voiceprint information, comparing the acquired voiceprint information with pre-stored voiceprint information of the user, and determining that the verification is successful if the acquired voiceprint information is consistent with the pre-stored voiceprint information of the user, may include:

processing the voice information to acquire the voiceprint information, and identifying the voice information to acquire the text information;

returning the text information to the client for acknowledgment by the user; and receiving from the client a message that the user acknowledges that the text information is correct, comparing the content in the verification picture with the text information, and comparing the acquired voiceprint information with pre-stored voiceprint information of the user; and determining that the verification is successful if content in the verification picture is consistent with the text information and if the acquired voiceprint information is consistent with the pre-stored voiceprint information of the user.

With reference to the above method, in a third implementation manner, the processing the voice information and performing verification according to the acquired voiceprint information and/or text information may include:

identifying the voice information to acquire the text information;

returning the text information to the client for acknowledgment by the user; and receiving from the client a message that the user acknowledges that the text information is correct, and comparing the content in the verification picture with the text information; and determining that the verification is successful if content in the verification picture is consistent with the text information.

With reference to the first implementation manner, in a fourth implementation manner, prior to the comparing the acquired voiceprint information with pre-stored voiceprint information of the user, the method may further include:

judging whether the pre-stored voiceprint information includes the voiceprint information of the user;

performing an operation of comparing the acquired voiceprint information with the pre-stored voiceprint information of the user if the pre-stored voiceprint information includes the voiceprint information of the user; and creating a mapping relationship between the user and the acquired voiceprint information and storing the mapping relationship if the pre-stored voiceprint information does not include the voiceprint information of the user.

With reference to the above method and any one of the first to fourth implementation manners, in a fifth implementation manner, the sending a verification picture to a client according to a verification request from the client may include:

receiving from the client a request for pulling a verification picture; and sending the verification picture to the client.

In this embodiment, the processing the voice information to acquire voiceprint information involves a voiceprint identification technology. The voiceprint identification technology refers to a biological identification method for automatically identifying the identity of a speaker according to the physiological and behavioral features of the pronunciation of the speaker. By extracting acoustic features from the voice information, for example, frequency spectrum, cepstrum, formant, fundamental tone and other acoustic features, and transforming various acoustic features into voiceprint information according to a specific algorithm, the voiceprint information may uniquely identify the user corresponding to the voiceprint information, and the result of identification has high accuracy. The security of the voiceprint identification is comparable with that of other biological identification technologies, such as fingerprint identification, hand geometry identification and iris identification; furthermore, the voice collection devices have low manufacture cost, and only a fixed-line phone, a mobile phone or a microphone is required with no need of any special devices. In addition, as the voiceprint identification has nothing to do with language, dialect or accent and does not involve private topics, it is applicable to a wide range of people.

The above method provided in this embodiment may be specifically implemented by a server.

For the above method provided in this embodiment, by sending a verification picture to a client, acquiring from the client voice information that is input by a user according to the verification picture, processing the voice information and performing verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved.

Figure 2:
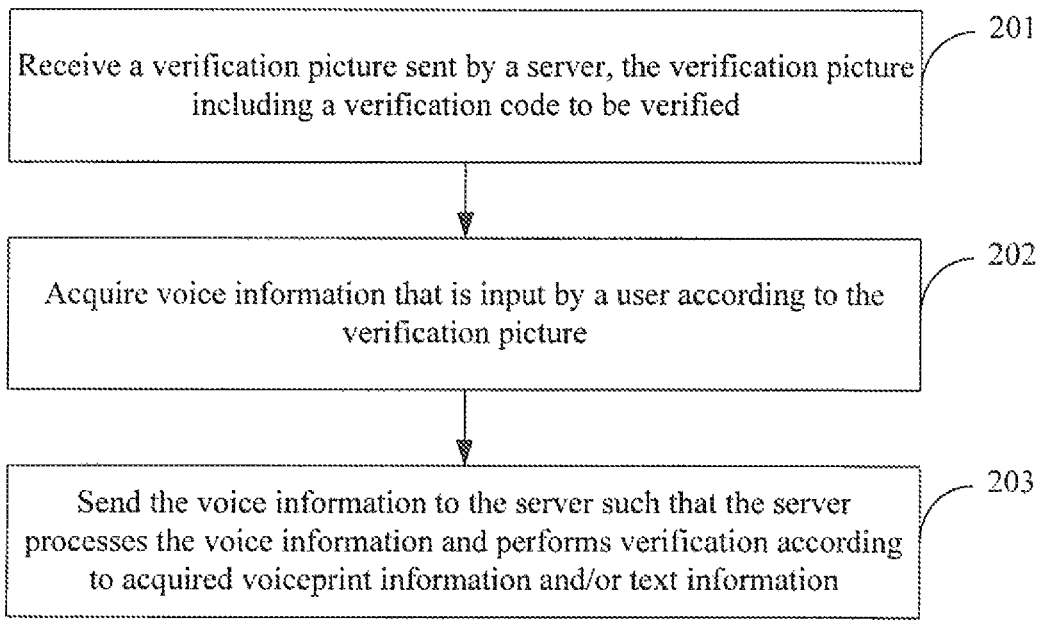
FIG. 2 is a flowchart of a method for verifying a verification code according to another embodiment of the present disclosure.

Referring to FIG. 2, another embodiment of the present disclosure provides a method for verifying a verification method, including:

201: receiving a verification picture sent by a server, the verification picture including a verification code to be verified;

202: acquiring voice information that is input by a user according to the verification picture; and 203: sending the voice information to the server such that the server processes the voice information and performs verification according to acquired voiceprint information and/or text information.

With reference to the above method, in a first implementation manner, the sending the voice information to the server such that the server processes the voice information and performs verification according to the acquired voiceprint information and/or text information may include:

sending the voice information to the server such that the server processes the voice information to acquire the voiceprint information and identifies the voice information to acquire the text information;

receiving the text information returned by the server, and providing the text information to the user for acknowledgment; and forwarding a message that the user acknowledges that the text information is correct, such that the server compares content in the verification picture with the text information, compares the voiceprint information with pre-stored voiceprint information of the user after receiving the message, and determines that the verification is successful if the content in the verification picture is consistent with the text information and if the voiceprint information is consistent with the pre-stored voiceprint information of the user.

With reference to the above method, in a second implementation manner, the sending the voice information to the server such that the server processes the voice information and performs verification according to acquired voiceprint information and/or text information may include:

sending the voice information to the server such that the server identifies the voice information to acquire the text information;

receiving the text information returned by the server, and providing the text information to the user for acknowledgment; and forwarding a message that the user acknowledges that the text information is correct to the server, such that the server compares the content in the verification picture with the text information upon receiving the message, and determines that the verification is successful when the content in the verification picture is consistent with the text information.

With reference to the above method or the first or the second implementation manner, in a third implementation manner, prior to the receiving a verification picture sent by a server, the method may further include:

sending a request for pulling a verification picture to the server.

The above method provided in this embodiment may be specifically implemented by a client. The client may be a computer, a laptop computer, a mobile terminal or a tablet computer or the like, which is not specifically limited in the embodiment of the present disclosure.

For the above method provided in this embodiment, by receiving a verification picture sent by a server, acquiring voice information that is input by a user according to the verification picture, and sending the voice information to the server such that the server processes the voice information and performs verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved.

Figures 3, 4:
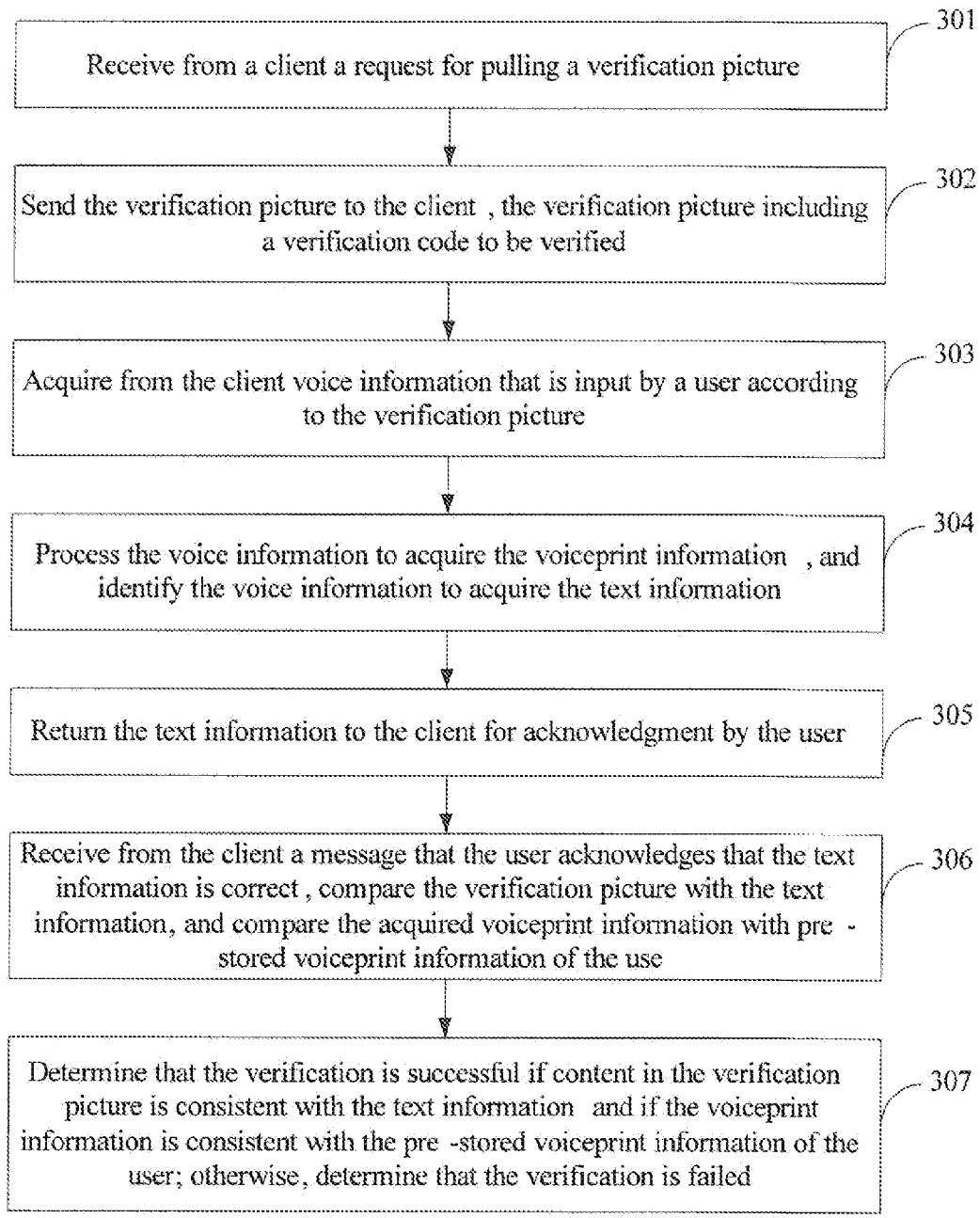
FIG. 3 is a flowchart of a method for verifying a verification code according to yet another embodiment of the present disclosure.
FIG. 4 is a schematic diagram of a verification picture according to another embodiment of the present disclosure.

Referring to FIG. 3, yet another embodiment of the present disclosure provides a method for verifying a verification code, including:

301: Receiving from a client a request for pulling a verification picture.

302: Sending the verification picture to the client, the verification picture including a verification code to be verified.

In this embodiment, the verification picture further contains some interference elements other than the verification code to be verified. The verification code may be any combination of numbers, letters, characters and the like, and the interference elements may be random straight lines, curves, noise and the like, which is not specifically limited in the embodiment of the present disclosure.

For example, referring to FIG. 4, a schematic diagram of a verification picture provided in this embodiment is illustrated. In FIG. 4, the content in the upper verification picture is 06ac, and there are some noises as the reference elements in this picture; and, the content in the lower verification picture is PEHV, and there is a curve as the reference element in this picture.

303: Acquiring from the client voice information that is input by a user according to the verification.

In this embodiment, inputting voice information by a user according to the verification picture means that the user reads the content in the verification picture and inputs into the client via a voice input device after viewing the verification picture. The voice input device may be a microphone or the like.

304: Processing the voice information to acquire voiceprint information, and identifying the voice information to acquire the text information.

In this embodiment, specifically, the voice information may be identified by a pre-designated voice identification algorithm to acquire the text information. The voice identification algorithm is not specifically limited in this embodiment of the present disclosure.

305: Returning the text information to the client for acknowledgment by the user.

306: Receiving a message that the user acknowledges that the text information is correct, comparing the verification picture with the text information, and comparing the acquired voiceprint information with the pre-stored voiceprint information of the user.

In this embodiment, the flow ends if the user acknowledges that the text information is incorrect.

In this embodiment, further, prior to the comparing the acquired voiceprint information with the pre-stored voiceprint information of the user, the method may further include:

judging whether the voiceprint information stored in advance contains the voiceprint information of the user; performing an operation of comparing the acquired voiceprint information with the pre-stored voiceprint information of the user if the voiceprint information stored in advance contains the voiceprint information of the user, and creating a mapping relationship between the user and the acquired voiceprint information and storing the mapping relationship if the voiceprint information stored in advance does not contain the voiceprint information of the user. Here, the flow ends.

The creating a mapping relationship between the user and the acquired voiceprint information and storing the mapping relationship may be convenient to perform verification by using the stored voiceprint information of the user when the identity of the user is verified subsequently. With this way, it is just required to store the voiceprint information of the user when the user inputs voice information for the first time, instead of storing the voiceprint information of the user every time the user inputs voice information, thereby simplifying the operation and improving the efficiency. Certainly, the voiceprint information of the user may be collected for multiple times according to different requirements, and the number of times of collection may be recorded correspondingly, etc., which is not specifically limited in this embodiment.

307: Determining that the verification is successful if the content in the verification picture is consistent with the text information and if the acquired voiceprint information is consistent with the pre-stored voiceprint information of the user, otherwise, determining that the verification is failed.

The method provided in this embodiment is applicable to a scenario where a user performs some operations on the client. In such a scenario, the server is required to verify the identity of the user. Specifically, the server verifies the identity of the user via a verification code; if the verification via the verification code is successful, the identity of the user is determined to be authorized, and the user is allowed to perform corresponding operations on the client; and if the verification via the verification code is failed, the user is determined to be unauthorized, and the user is prohibited to perform corresponding operations on the client. If the acquired voiceprint information is consistent with the pre-stored voiceprint information of the user, it is determined that the verification is successful; and if the acquired voiceprint information is inconsistent with the pre-stored voiceprint information of the user, it is determined that the verification is failed. The client may be a computer, a laptop computer, a mobile terminal or a tablet computer or the like, which is not specifically limited in this embodiment of the present disclosure.

For example, if a user downloads a document from a client, a server verifies the user via a verification code. If the verification is successful, the user is allowed to download the document; and if the verification is failed, the user is prohibited to download the document.

In this embodiment, processing the voice information to acquire voiceprint information is a voiceprint identification technology. The voiceprint identification technology refers to a biological identification method for automatically identifying the identity of a speaker according to the physiological and behavioral features of the pronunciation of the speaker. By extracting acoustic features of the voice information, and transforming various acoustic features into voiceprint information according to a specific algorithm, the voiceprint information may uniquely identify the user corresponding to the voiceprint information, and the result of identification has high accuracy. The security of the voiceprint identification is comparable with that of other biological identification technologies, such as fingerprint identification, hand geometry identification and iris identification; furthermore, the voice collection devices have low manufacture cost, and only a fixed-line phone, a mobile phone or a microphone is required with no need of any special devices. In addition, as the voiceprint identification has nothing to do with language, dialect or accent and does not involve private topics, it is applicable to a wide range of people.

For the above method provided in this embodiment, by sending a verification picture to a client, acquiring from the client voice information that is input by a user according to the verification picture, processing the voice information and performing verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved. Further, the text comparison is further performed on the basis of voiceprint comparison, such that the accuracy of verification is further improved, and the result of verification is more accurate.

Figure 5:
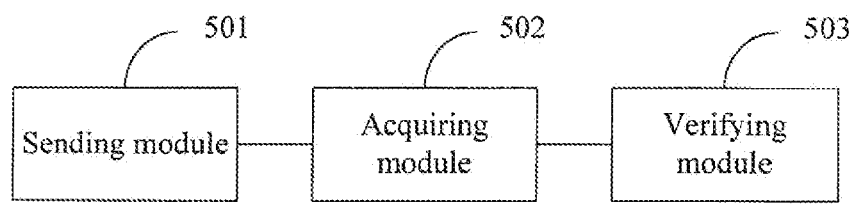
FIG. 5 is a structure diagram of a server for verifying a verification code according to another embodiment of the present disclosure.

Referring to FIG. 5, another embodiment of the present disclosure further provides a server for verifying a verification code, including:

a sending module 401, configured to send a verification picture to a client according to a verification request from the client;

an acquiring module 402, configured to acquire from the client voice information that is input by a user according to the verification picture; and a verifying module 403, configured to process the voice information and perform verification according to acquired voiceprint information and/or text information.

With reference to the above server, in a first implementation manner, the verifying module 403 may include:

a voice verifying unit, configured to process the voice information to acquire voiceprint information and compare the acquired voiceprint information with pre-stored voiceprint information of the user, and determine that the verification is successful if the acquired voiceprint information is consistent with the pre-stored voiceprint information of the user.

With reference to the first implementation manner, in a second implementation manner, the voice verifying unit may be configured to:

process the voice information to acquire the voiceprint information, and identify the voice information to acquire the text information;

return the text information to the client for acknowledgment by the user; and receive from the client a message that the user acknowledges that the text information is correct, compare the content in the verification picture with the text information, compare the acquired voiceprint information with the pre-stored voiceprint information of the user, and determine that the verification is successful if the content in the verification picture is consistent with the text information and if the acquired voiceprint information is consistent with the pre-stored voiceprint information of the user.

With reference to the above server, in a third implementation manner, the verifying module 403 may include:

a text verifying unit, configured to identify the voice information to acquire the text information, return the text information to the client for acknowledgment by the user, receive from the client a message that the user acknowledges that the text information is correct, compare the content in the verification picture with the text information, and determine that the verification is successful if content in the verification picture is consistent with the text information.

With reference to the first implementation manner, in a fourth implementation manner, the verifying module 403 may be further configured to:

judge whether the pre-stored voiceprint information includes the voiceprint information of the user prior to comparing the acquired voiceprint information with the pre-stored voiceprint information of the user;

perform an operation of comparing the acquired voiceprint information with the pre-stored voiceprint information of the user if the pre-stored voiceprint information includes the voiceprint information of the user; and create a mapping relationship between the user and the acquired voiceprint information and store the mapping relationship if the pre-stored voiceprint information does not include the voiceprint information of the user.

With reference to the above server or any one of the first to fourth implementation manners, in a fifth implementation manner, the server may further include:

a receiving module, configured to receive from the client a request for pulling a verification picture; and correspondingly, the sending module 401 is configured to send the verification picture to the client upon receiving the request.

The server provided in this embodiment may perform the method provided in any one of the above method embodiments. The detailed process refers to the descriptions in the method embodiments and will not be repeated here.

The client may access the server via an access device. The access device may also be a separate access server. Each of the above modules or units may be integrated in one server, or may also be integrated in a plurality of servers. Each of the plurality of servers is at least integrated with one module or unit, which is not specifically limited in this embodiment of the present disclosure. The client may be a computer, a laptop computer, a mobile terminal or a tablet computer or the like, which is not specifically limited in this embodiment of the present disclosure.

Figure 6:
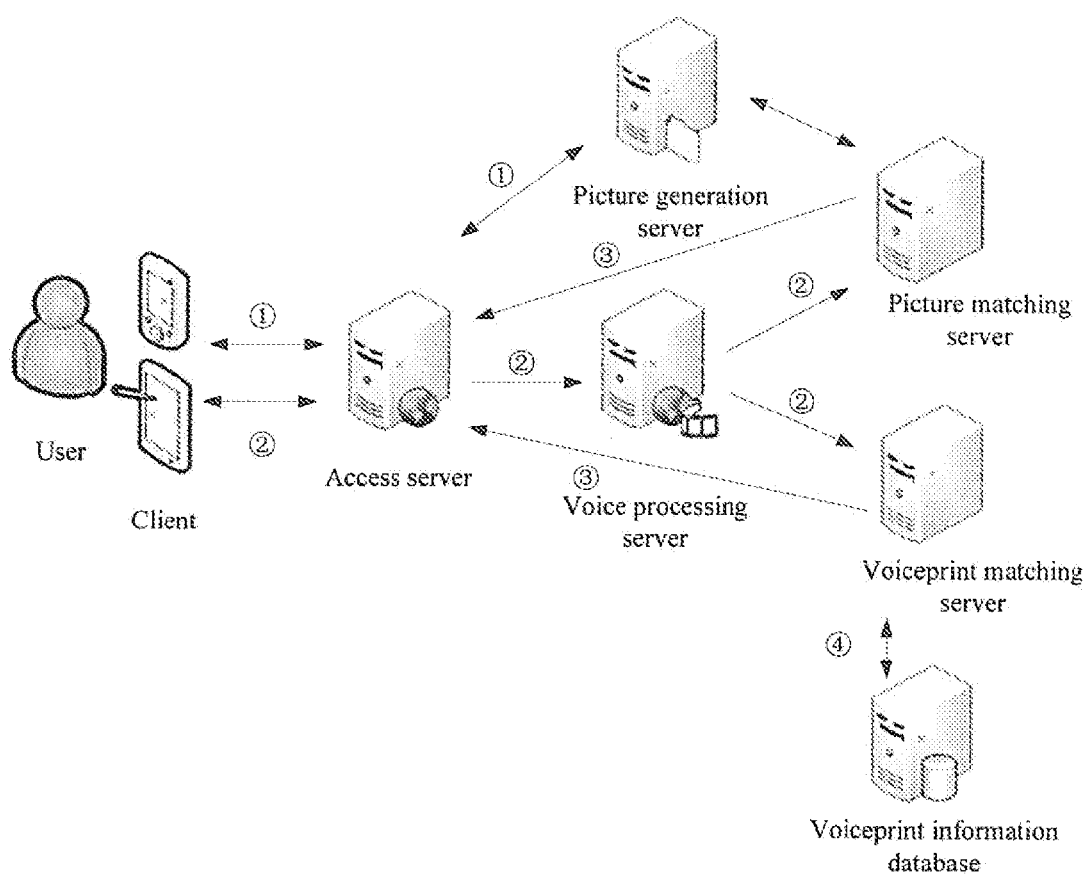
FIG. 6 is a schematic diagram of an application scenario according to another embodiment of the present disclosure.

For example, referring to FIG. 6, a schematic diagram of a scenario where the above modules or units provided in this embodiment are integrated in a plurality of servers is illustrated. The above modules or units are integrated in a picture generation server, a voice processing server, a picture matching server, a voiceprint matching server and a voiceprint information database, respectively. The client used by the user is accessed to the network side via a separate access server. The voiceprint information database is configured to store all voiceprint information of a user. The picture generation server is configured to generate a verification picture. The voice processing server is configured to identify voice information to acquire the text information, and process the voice information to acquire voiceprint information of the user. The picture matching server is configured to compare the verification picture generated by the picture generation server with the text information acquired by the voice processing server. The voiceprint matching server is configured to compare the voiceprint information acquired by the voice processing server with the voiceprint information of the user stored in the voiceprint information database.

The verification flow in the application scenario as illustrated in FIG. 5 may be as follows: (1) a client sends a request for pulling a verification picture to a picture generation server via an access server, and, the picture generation server generates a verification picture according to the request after receiving the request, and then returns the verification picture to the client via the access server; (2) the user of the client inputs voice information according to the verification picture and then transmits the voice information to a voice processing server via the access server; and, the voice processing server identifies the voice information to acquire text information and processes the voice information to acquire voiceprint information upon receiving the voice information, and then transmits the text information to a picture matching server for verification and transmits the voiceprint information to a voiceprint matching server for verification; (3) the picture matching server compares whether the content in the verification picture is consistent with the text information upon receiving the text information, and returns the result of comparison to the client via the access server; and, the voiceprint matching server compares whether the voiceprint information collected this time is consistent with voiceprint information of the user stored in the voiceprint information database upon receiving the voiceprint information, and returns the result of comparison to the client via the access server; and, (4) the voiceprint information database may further update the information in the database according to the voiceprint information collected this time, for example, update the number of times of collection of the voiceprint information of the user.

For the above server provided in this embodiment, by sending a verification picture to a client, acquiring from the client voice information that is input by a user according to the verification picture, processing the voice information and performing verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved. Further, the text comparison is further performed on the basis of voiceprint comparison, such that the accuracy of verification is further improved, and the result of verification is more accurate.

Figure 7:
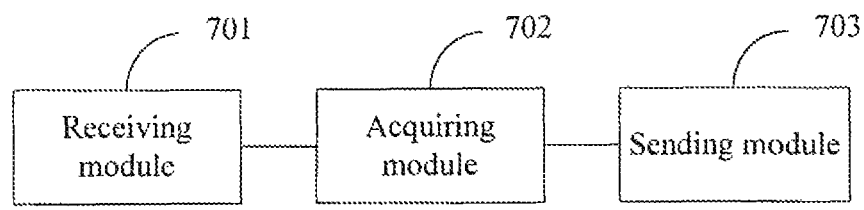
FIG. 7 is a structure diagram of a client for verifying a verification code according to another embodiment of the present disclosure.

Referring to FIG. 7, another embodiment of the present disclosure further provides a client for verifying a verification code, including:

a receiving module 701, configured to receive a verification picture sent by a server, the verification picture including a verification code to be verified;

an acquiring module 702, configured to acquire voice information that is input by a user according to the verification picture; and a sending module 703, configured to send the voice information to the server, such that the server processes the voice information and performs verification according to the acquired voiceprint information and/or text information.

With reference to the above client, in a first implementation manner, the sending module 703 may be configured to:

send the voice information to the server, such that the server processes the voice information to acquire the voiceprint information and identifies the voice information to acquire the text information;

receive the text information returned by the server, and provide the text information to the user for acknowledgment; and forward a message that the user acknowledges that the text information is correct to the server, such that the server compares the content in the verification picture with the text information, compares the voiceprint information with pre-stored voiceprint information of the user, and determine that the verification is successful if the content in the verification picture is consistent with the text information and if the voiceprint information is consistent with the pre-stored voiceprint information of the user.

With reference to the above client, in a second implementation manner, the sending module 703 may be configured to:

send the voice information to the server, such that the server identifies the voice information to acquire the text information;

receive the text information returned by the server, and provide the text information to the user for acknowledgment; and forward a message that the user acknowledges that the text information is correct to the server, such that the server compares content in the verification picture with the text information upon receiving the message, and determines that the verification is successful if the content in the verification picture is consistent with the text information.

With reference to the above client or the above first or second implementation manner, in a third implementation manner, the client may further include:

a request module, configured to sent a request for pulling a verification picture to the server before the receiving module 701 receives the verification picture sent by the server.

The above client provided in this embodiment may perform the method provided in any one of the above method embodiments. The detailed process refers to the descriptions in the method embodiments and will not be repeated here.

For the above client provided in this embodiment, by receiving a verification picture sent by a server, acquiring voice information that is input by a user according to the verification picture, and sending the voice information to the server such that the server processes the voice information and performs verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved.

Figure 8:
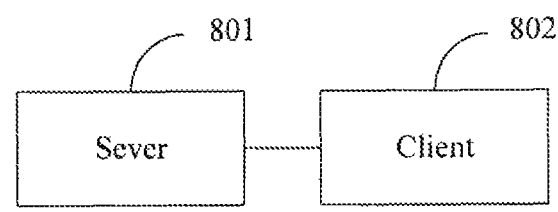
FIG. 8 is a structure diagram of a system for verifying a verification code according to another embodiment of the present disclosure.

Referring to FIG. 8, another embodiment of the present disclosure further provides a system for verifying a verification code, including a server 801 and a client 802.

The server 801 has a same function as the server for verifying a verification code provided in the embodiment as illustrated in FIG. 5, and the client 802 has a same function as the client for verifying a verification code provided in the embodiment as illustrated in FIG. 7, which will not be repeated here.

The above system provided in this embodiment may perform the method provided in any one of the above method embodiments. The detailed process refers to the descriptions in the method embodiments and will not be repeated here.

For the above system provided in this embodiment, by sending a verification picture to a client via a server, acquiring from the client voice information that is input by a user according to the verification picture, processing the voice information and performing verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved. Further, the text comparison is further performed on the basis of voiceprint comparison, such that the accuracy of verification is further improved, and the result of verification is more accurate.

Another embodiment of the present disclosure further provides a non-transitory readable storage medium with one or more programs stored thereon. The one or more programs, when executed in a device, cause the device to run instructions for performing the following steps:

sending a verification picture to a client according to a verification request from the client, the verification picture including a verification code to be verified;

acquiring from the client voice information that is input by a user according to the verification picture; and processing the voice information and performing verification according to the acquired voiceprint information and/or text information.

The processing the voice information and performing verification according to the acquired voiceprint information and/or text information includes:

processing the voice information to acquire voiceprint information, comparing the acquired voiceprint information with the pre-stored voiceprint information of the user, and determining that the verification is successful if the acquired voiceprint information is consistent with the pre-stored voiceprint information of the user.

The processing the voice information to acquire the voiceprint information, comparing the acquired voiceprint information with pre-stored voiceprint information of the user, and determining indicated that the verification is successful if the acquired voiceprint information is consistent with the pre-stored voiceprint information of the user, includes:

processing the voice information to acquire voiceprint information, and identifying the voice information to acquire the text information;

returning the text information to the client for acknowledgment by the user; and receiving from the client a message that the user acknowledges that the text information is correct, comparing the content in the verification picture with the text information, comparing the acquired voiceprint information with the pre-stored voiceprint information of the user, and determining that the verification is successful if the content in the verification picture is consistent with the text information and if the acquired voiceprint information is consistent with the pre-stored voiceprint information of the user.

The processing the voice information and performing verification according to the acquired voiceprint information and/or text information includes:

identifying the voice information to acquire the text information;

returning the text information to the client for acknowledgment by the user; and receiving from the client a message that the user acknowledges that the text information is correct, comparing the content in the verification picture with the text information, and determining that the verification is successful if the content in the verification picture is consistent with the text information.

Prior to the comparing the acquired voiceprint information with the pre-stored voiceprint information of the user, the method further includes:

judging whether the voiceprint information stored in advance contains the voiceprint information of the user;

performing an operation of comparing the acquired voiceprint information with the pre-stored voiceprint information of the user if the voiceprint information stored in advance contains the voiceprint information of the user; and creating a mapping relationship between the user and the acquired voiceprint information and store the mapping relationship if the voiceprint information stored in advance does not contain the voiceprint information of the user.

The sending a verification picture to a client according to a verification request from the client includes:

receiving a request for pulling a verification picture sent by the client; and sending the verification picture to the client.

For the above nonvolatile readable storage medium provided in this embodiment, by sending a verification picture to a client, acquiring from the client voice information that is input by a user according to the verification picture, processing the voice information and performing verification according to the acquired voiceprint information and/or text information, a verification method for a verification code based on audio input, and the traditional verification code and the voice identification technology are combined together, such that the extraction of voiceprint information of the user is implemented unconsciously without binding and setting via the user, and it is very convenient; it may be effectively distinguished whether the verification code is submitted by the user or by others, such that the problem of manual coding is effectively solved; only if the client is supported by voice input, for example, a microphone or the like, with low cost and convenience in promotion, the range of application is greatly expanded; furthermore, compared with the way of mobile phone verification code, operators are not required to distribute the verification code to the mobile phone, such that the operating cost of the server side is reduced and the overhead is saved.

Another embodiment of the present disclosure further provides a non-transitory computer-readable storage medium with one or more programs stored thereon. The one or more programs, when executed in a device, cause the device to run instructions for performing the following steps:

receiving a verification picture sent by a server, the verification picture including a verification code to be verified;

acquiring voice information that is input by a user according to the verification picture;

sending the voice information to the server such that the server processes the voice information and performs verification according to the acquired voiceprint information and/or text information.

The sending the voice information to the server such that the server processes the voice information and performs verification according to the acquired voiceprint information and/or text information includes:

sending the voice information to the server such that the server processes the voice information to acquire voiceprint information and identifies the voice information to acquire the text information;

receiving the text information returned by the server, and providing the text information to the user for acknowledgment; and forwarding a message that the user acknowledges that the text information is correct to the server, such that the server compares the content in the verification picture with the text information, compares the voiceprint information with the pre-stored voiceprint information of the user after receiving the message, and determines that the verification is successful if the content in the verification picture is consistent with the text information and if the voiceprint information is consistent with the pre-stored voiceprint information of the user.

The sending the voice information to the server such that the server processes the voice information and performs verification according to the acquired voiceprint information and/or text information includes:

sending the voice information to the server such that the server identifies the voice information to acquire the text information;

receiving the text information returned by the server, and providing the text information to the user for acknowledgment; and forwarding a message that the user acknowledges that the text information is correct to the server, such that the server compares the content in the verification picture with the text information after receiving the message, and determines that the verification is successful when the content in the verification picture is consistent with the text information.

Prior to the receiving a verification picture sent by a server, the method further includes:

sending a request for pulling a verification picture to the server.

For the above nonvolatile readable storage medium provided in this embodiment, by receiving a verification picture sent by a server, acquiring voice information that is input by a user according to the verification picture, and sending the voice information to the server such that the server processes the voice information and performs verification according to the acquired voiceprint information and/or text information, an audio input based method for checking a verification code is proposed. By integrating the traditional verification code with the voice identification technology, the method may unconsciously implement the extraction of voiceprint information of the user without requiring binding and setting of the user, the operation is thus very convenient. With this method, it may be effectively distinguished whether the verification code is submitted by the user or by others, such that the problem of manual coding is effectively solved. Furthermore, as the client is just required to support voice input, for example, a microphone or the like, the reconstruction cost is low, the promotion is convenient, and the range of application is greatly expanded. In addition, compared with the way of mobile phone verification code, as operators are not required to issue any verification code to the mobile phone, the operating cost at the server side is greatly reduced and the overhead is saved.

Persons of ordinary skill in the art may understand that all or a part of the steps of the foregoing embodiments may be implemented by hardware or a program instructing related hardware. The program may be stored in a non-transitory computer-readable storage medium. The storage medium may be a read-only memory, a magnetic disk, an optical disk, and the like.

Described above are merely exemplary embodiments of the present disclosure, and are not intended to limit the present disclosure. Any modification, equivalent replacement and improvement made within the spirit and principle of the present disclosure shall fall into the protection scope of the present disclosure.

What is claimed is:

1. A method for providing electronic access to an electronic system, comprising:

sending an electronic verification picture to a client electronic device for display on the client electronic device in response to a verification request sent from the client electronic device, the electronic verification picture comprising a verification code to be verified wherein the verification code comprises a verification text that is scrambled with visual noises;

acquiring from the client electronic device a voice information that is uttered by a user in response to the electronic verification picture and the verification code;

extracting acoustic features from the voice information;

transforming the acoustic features to obtain a voiceprint information uniquely identifying the user;

comparing the voiceprint information with a pre-stored voiceprint information of the user in a voiceprint information database;

processing the voice information to obtained a recognized text uttered by the user;

transmitting the recognized text to the client electronic device for an electronic acknowledgement that the recognized text matches what the user uttered;

receiving the electronic acknowledgement from the client electronic device; and providing the client electronic device an electronic access to the electronic system when:
the voiceprint information is consistent with the pre-stored voiceprint information of the user;
the electronic acknowledgement indicates that the recognized text matches what the user uttered; and
the recognized text matches the verification text.

2. The method according to claim 1, wherein the electronic verification picture further comprises visual noises for obscuring the verification code and the verification text.

3. The method according to claim 1, wherein prior to the comparing the voiceprint information with the pre-stored voiceprint information of the user, the method further comprises:
determining whether the voiceprint information database comprises the pre-stored voiceprint information of the user; and
creating a mapping relationship between the user and the voiceprint information, and storing the voiceprint information as the pre-stored voiceprint information for the user in the voiceprint information database when the voiceprint information database does not comprise the pre-stored voiceprint information of the user.

4. The method according to claim 1, wherein the sending the electronic verification picture to the client electronic device according to the verification request from the client electronic device comprises:
receiving from the client electronic device a request for pulling the electronic verification picture; and
sending the electronic verification picture to the client electronic device in response to receiving the request for pulling the electronic verification picture.

5. A method for gaining electronic access to an electronic system, comprising:
receiving and displaying an electronic verification picture sent by a server, the electronic verification picture comprising a verification code to be verified wherein the verification code comprises a verification text that is scrambled with visual noises;
acquiring a voice information that is uttered by a user in response to the electronic verification picture and the verification code;
sending the voice information to the server such that the server processes the voice information to extract acoustic features from the voice information, transform the acoustic features into a voiceprint information uniquely identifying the user, compare the voiceprint information with a pre-stored voiceprint information of the user in a voiceprint information database, and obtain a recognized text uttered by the user from the voice information;
receiving the recognized text from the server;
displaying the recognized text to the user;
receiving an instruction from the user to generate an electronic acknowledgement that the recognized text matches what the user uttered;
sending the electronic acknowledgement to the server; and
obtaining access to the electronic system when:
the voiceprint information is consistent with the pre-stored voiceprint information of the user;
the electronic acknowledgement indicates that the recognized text matches what the user uttered; and
the recognized text matches the verification text.

6. The method according to claim 5, wherein the electronic verification picture further comprises visual noises for obscuring the verification code and the verification text.

7. The method according to claim 5, wherein prior to the receiving the electronic verification picture sent by the server, the method further comprises:
sending a request for pulling the electronic verification picture to the server.

8. A server for providing electronic access to an electronic system, comprising a processor, a voiceprint information database, and a memory for storing instructions, wherein the processor when executing the instructions, is configured to:
send an electronic verification picture to a client electronic device in response to a verification request sent from the client electronic device, the electronic verification picture comprising a verification code to be verified wherein the verification code comprises a verification text that is scrambled with visual noises;
acquire from the client electronic device a voice information that is uttered by a user in response to the electronic verification picture and the verification code;
extract acoustic features from the voice information;
transform the acoustic features to obtain a voiceprint information uniquely identifying the user;
compare the voiceprint information with a pre-stored voiceprint information of the user in the voiceprint information database;
process the voice information to obtained a recognized text uttered by the user;
transmit the recognized text to the client electronic device for an electronic acknowledgement that the recognized text matches what the user uttered;
receive the electronic acknowledgement from the client electronic device; and
provide the client electronic device an electronic access to the electronic system when:
the voiceprint information is consistent with the pre-stored voiceprint information of the user;
the electronic acknowledgement indicates that the recognized text matches what the user uttered; and
the recognized text matches the verification text.

9. The server according to claim 8, wherein the electronic verification picture further comprises visual noises for obscuring the verification code and the verification text.

10. The server according to claim 8, wherein the processor, prior to executing the instructions to compare the voiceprint information to the pre-stored voiceprint information of the user, is further configured to execute the instructions to:

determine whether the voiceprint information database comprises the pre-stored voiceprint information of the user; and create a mapping relationship between the user and the voiceprint information and store the voiceprint information as the pre-stored voiceprint information for the user in the voiceprint information database when the voiceprint information database does not comprise the pre-stored voiceprint information of the user.

11. The server according to claim 8, wherein the processor, when executing the instructions, is further configured to:

to receive from the client electronic device a request for pulling the electronic verification picture; and send the electronic verification picture to the client electronic device upon receiving the request for pulling the electronic verification picture.

12. A client electronic device comprising a processor, a display screen, a voiceprint information database, and a memory for storing instructions, wherein the processor when executing the instructions, is configured to:

receive an electronic verification picture sent by a server, the electronic verification picture comprising a verification code to be verified wherein the verification code comprises a verification text that is scrambled with visual noises;

displaying the electronic verification picture on the display screen;

acquire a voice information that is uttered by a user in response to the electronic verification picture and the verification code;

send the voice information to the server, such that the server processes the voice information to extract acoustic features from the voice information, transform the acoustic features into a voiceprint information uniquely identifying the user, compare the voiceprint information with a pre-stored voiceprint information of the user in a voiceprint information database, and obtain a recognized text uttered by the user from the voice information;

receive the recognized text from the server;

display the recognized text to the user on the display screen;

receive an instruction from the user to generate an electronic acknowledgement that the recognized text matches what the user uttered;

send the electronic acknowledgement to the server; and obtain access to an electronic system when:

the voiceprint information is consistent with the pre-stored voiceprint information of the user;

the electronic acknowledgement indicates that the recognized text matches what the user uttered; and the recognized text matches the verification text.

13. The client electronic device according to claim 12, wherein the electronic verification picture further comprises visual noises for obscuring the verification code and the verification text.

14. The client electronic device according to claim 12, wherein the processor, when executing the instructions, is further configured to:

send a request for pulling the electronic verification picture to the server before receiving the electronic verification picture sent by the server.

\* \* \* \* \*